No. 777,372. PATENTED DEC. 13, 1904.
E. G. HOWARD.
MOTOR DRIVEN VALVE MECHANISM.
APPLICATION FILED SEPT. 18, 1902.
NO MODEL. 3 SHEETS—SHEET 3.

Witnesses
Inventor
Ernest G. Howard
By Webster Taft & Tilley
Attorneys

No. 777,372.  
Patented December 13, 1904.

UNITED STATES PATENT OFFICE.

ERNEST G. HOWARD, OF SPRINGFIELD, MASSACHUSETTS, ASSIGNOR TO CHAPMAN VALVE MANUFACTURING COMPANY, OF SPRINGFIELD, MASSACHUSETTS, A CORPORATION OF MASSACHUSETTS.

MOTOR-DRIVEN VALVE MECHANISM.

SPECIFICATION forming part of Letters Patent No. 777,372, dated December 13, 1904.

Original application filed March 31, 1902, Serial No. 100,699. Divided and this application filed September 18, 1902. Serial No. 123,955. (No model.)

*To all whom it may concern:*

Be it known that I, ERNEST G. HOWARD, a citizen of the United States, residing at Springfield, in the county of Hampden and Commonwealth of Massachusetts, have invented new and useful Improvements in Motor-Driven Valve Mechanism, the same being a division of my application filed March 31, 1902, Serial No. 100,699, of which the following is a specification.

My invention relates to improvements in mechanism for opening and closing the plug or gate of a valve by means of a motor in which one or more lost-motion devices are used; and the objects of my improvement are, first, to provide means whereby a comparatively small motor can be employed for actuating the gate; second, to furnish simple and effective means for this purpose; third, to provide means for easily and quickly disconnecting the motor, so as to enable the gate to be operated by hand; fourth, to effect economy in construction and operation, and, fifth, to afford such means applicable to any of the well-known forms of water, steam, or other valve constructions.

Heretofore in order to employ an electric motor for operating large valves it has been necessary to resort to the use of a very much larger motor than would be needed for simply actuating the gate after being started owing to the increased amount of power required to start or release said gate. When the gate is actuated into either of its extreme positions, or, in other words, reaches the limit of its travel, it becomes wedged into place or binds, and the screw by which said gate is operated also binds, and considerably more force is required to unlock said screw and start the gate than would be necessary in the absence of such frictional resistance—more, in fact, than is actually needed for the continuation of the balance of the opening or closing operation.

My invention renders a small motor entirely adequate for the performance of all work required in the operation of valves by providing a suitable lost-motion device or devices between the motor and gate, whereby the motor is enabled to gather sufficient momentum to overcome the initial resistance.

I attain the above-mentioned objects by the mechanism illustrated in the accompanying drawings, in which—

Figure 1:
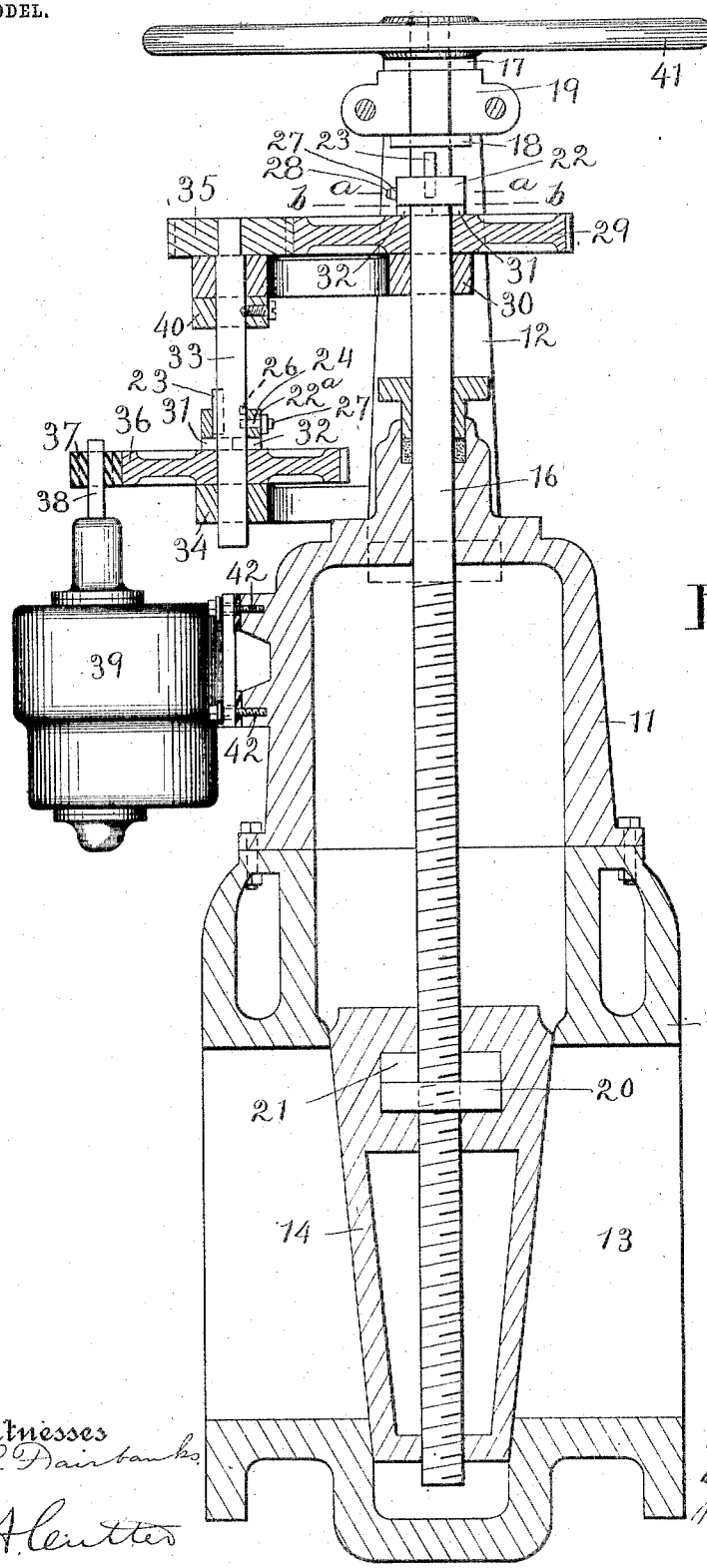
Figure 2:
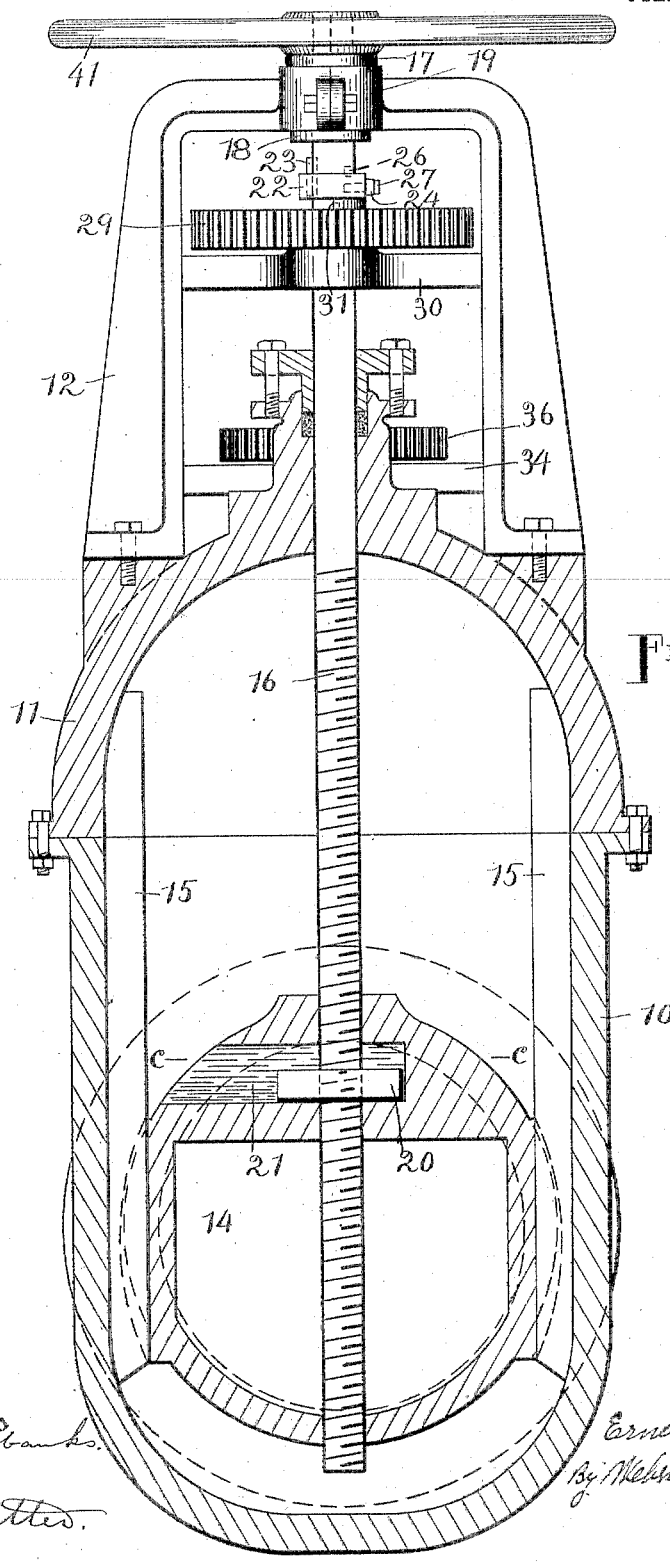
Figure 3:
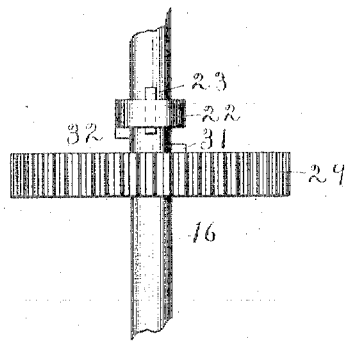
Figure 4:
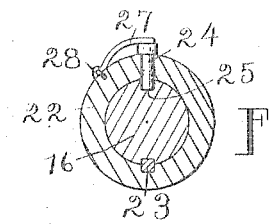
Figure 5:
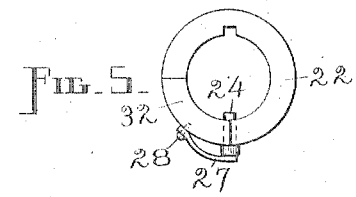
Figure 6:
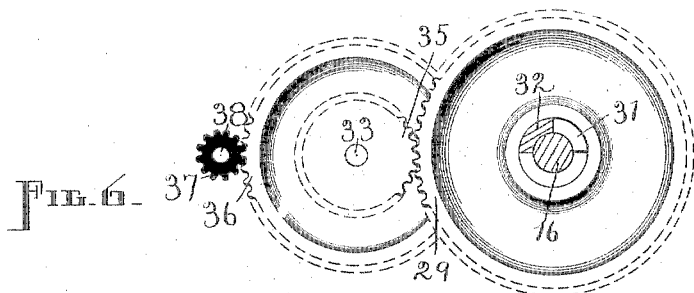

Figure 1 is a cross-section of a valve embodying my invention and having a motor attached thereto; Fig. 2, a side view of the yoke and sectional view of other parts of the valve; Fig. 3, an elevation of the slip-ring lost-motion device on the valve-spindle, showing said ring and gear disengaged; Fig. 4, an enlarged section through the spindle on lines $a\ a$, Fig. 1; Fig. 5, an enlarged bottom view of the aforesaid slip-ring; Fig. 6, a section through the spindle on lines $b\ b$, Fig. 1, also showing the train of gears between said spindle and motor; and Fig. 7, a section through the upper part of the gate on lines $c\ c$, Fig. 2.

Valves are divided in two classes—one in which an outside screw is used and the other in which an inside screw is used. The present mechanism relates more particularly to the inside-screw construction, wherein the spindle is threaded into the gate either directly or indirectly, which moves up or down on said spindle when the same is revolved, although the slip-ring on the intermediate shaft may be used with the outside-screw construction, as will be hereinafter explained.

Broadly considered, my invention consists of a lost-motion device introduced into the valve mechanism between the motor and the gate, the essential features of which are rotary members provided with clutch projections normally extending into each other's paths of travel, the combined arcs of said projections being less than a complete circle, and means to so change the relative positions of such projections that they no longer engage when revolved. In addition to the before-mentioned lost-motion device another lost-motion device, comprising a nut adapted to reciprocate within predetermined bounds, may be employed.

Similar figures refer to similar parts throughout the several views.

Referring to Figs. 1 and 2, a body 10 is shown having a cap 11 mounted thereon, which in turn supports a yoke 12. The passage 13 through the body 10 is closed by a gate 14. The gate 14 is guided by ribs or splines 15 15 in the usual manner. A spindle 16, screw-threaded at its lower terminal, extends through the center of the yoke 12 and cap 11, which is provided with a suitable stuffing-box and follower for said spindle, and the latter continues downward through the gate 14. The spindle is held against longitudinal movement by collars 17 and 18, fast thereon and below the yoke-head 19, respectively. The lower threaded terminal of the spindle may directly engage a threaded opening or openings in the gate 14, or a lost-motion device may be introduced at this point, comprising a nut 20, through which said spindle passes and to which it is threaded. The nut 20 is situated in a recess 21 in the upper part of the gate, the height of said recess being greater than that of said nut in order to provide for a limited amount of independent movement on the part of the latter for the purposes presently to be described.

Below the collar 18 is a slip-ring 22, held to the spindle 16 by means of a key 23, fixed in said spindle, and a pin 24, passing through said ring into an opening 25 in the spindle. Above the opening 25 is a similar opening 26, with which the pin 24 is adapted to register when the ring 22 is elevated, as shown in Fig. 3. Thus it will be seen that the ring 22 may be retained at either one of two elevations. A spring-catch 27 is pivoted at 28 to the ring, and its free end is adapted to be swung over the head of the pin 24 to press it into either opening 25 or 26 or to be forced to one side of said head for the purpose of releasing said pin and permitting it to be withdrawn from engagement with the spindle.

A gear 29 is loose on the spindle 16 below the slip-ring, being supported by the yoke-bracket 30. A clutch projection 31 extends upward from the top of the gear 29, and a clutch projection 32 depends from the bottom of the ring 22 normally into the path of said projection 31; but when said ring is elevated into the position shown in Fig. 3 the projections are out of possible engagement.

An intermediate shaft 33 has its bearings in the bracket 30 and another yoke-bracket 34 below the first. A pinion 35, tight on the upper end of the shaft 33, meshes with the gear 29, and a gear 36 on said shaft above the bracket 34 meshes with a pinion 37, tight on the shaft 38 of a motor 39, which is securely bolted to the cap 11. A collar 40, tight on the shaft 33 below the bracket 31, and the pinion 35 hold said shaft against longitudinal movement. A slip-ring 22ᵃ is adjustably attached to the shaft 33 by means of a key 23 and pin 24 in the same way that the ring 22 is attached to the spindle 16 and has a clutch projection 32 extending into the path of a clutch projection 31 on the gear 36, which in this case is loose on said shaft.

In practice only one slip-ring would probably be used in one valve mechanism, the same being on either the spindle or intermediate shaft, but not on both, as shown for the sake of economy in illustration. It is obvious, moreover, that a nut or collar provided with a clutch projection and permanently attached to either the shaft 33 or spindle 16 may be substituted for one of the slip-rings, and such a nut or collar would be used in any event, if it were not desired to operate the mechanism by hand at times or when the same could be so operated conveniently without disconnecting the motor. Furthermore, the gear 36 can be made fast to the shaft 33 and a lost-motion device at this point dispensed with.

A hand-wheel 41 is mounted on the top of the valve-spindle so as to revolve therewith in the usual manner.

The clutch projections 31 and 32 are represented as one-quarter segments each; but it will be understood that these dimensions may be varied so long as their united arcs do not form a complete circle, in which event no lost motion would be possible, of course. The smaller the arcs the greater will be the amount of lost motion and the greater the number of revolutions of the motor before it does any material work, as will appear from the following:

When the gate 14 is closed, the mechanism hereinbefore described operates as follows to open the same: The motor 39 is set in motion and causes the gear 36 to revolve through the medium of the shaft 38 and pinion 37, said gear rotating freely to the right on the shaft 33 until the front end of the clutch projection 31 encounters the front end of the clutch projection 32 on the slip-ring 22ᵃ, when said shaft begins to revolve. The pinion 35 now revolving with the shaft 33 rotates the gear 29 on the valve-spindle 16 freely to the left until the clutch projection 31 on said gear encounters the clutch projection 32 on the slip-ring 22, when said spindle is rotated. It will now be seen that before motion is imparted to the spindle 16 the motor has gathered considerable momentum owing to the lost-motion devices introduced into the mechanism, the momentum being cumulative, as it were. The first effect of the rotation of the spindle is to raise the nut 20 from the bottom to the top of the recess 21, thus affording another opportunity for the motor to gather momentum. As soon as the nut 20 comes into contact with the top of the recess 21 the gate 14 is raised and continues to travel upward until it arrives at the top of the cap 11, which prevents further movement in this direction and causes the motor to stop. The lost-motion device or devices between the spindle and motor provide for sufficient momentum to unlock the spindle from the nut 20, for it will be understood that said nut was jammed tight against the bottom of the recess 21 before the spindle was rotated, and the lost-motion device between the spindle and gate allows the motor to gather sufficient momentum to overcome the resistance offered by frictional contact between the gate and its seat. In many cases the last-mentioned lost-motion device is not required, the other lost-motion device or devices enabling the motor to do all of the work without it. The gate is now open, and the nut 20 binds hard on the spindle.

To close the gate, reverse the motor to actuate the rotary and reciprocating members in the opposite directions to those previously described. In this case the gear 36 turns freely to the left until the rear end of the clutch projection 31 encounters the rear end of the clutch projection 32. Then the gear 29 is set in motion and turns freely to the right until the rear end of its clutch projection encounters the rear end of the clutch projection on the slip-ring above. Next the nut 20, having been started from its locking engagement with the spindle, descends on the revolving spindle 16 until it strikes the bottom of the recess 21, and finally the gate is lowered and wedged into place at the bottom of the body 10, when the motor stops.

The hand-wheel 41 is used to open or close the gate when for any reason it is not possible or desirable to employ the motor and may also serve in the capacity of a balance-wheel for the mechanism, such provision often being desirable in order to govern and regulate the action of the motor and coacting parts. By releasing either of the slip-rings 22 or 22ª from the spindle 16 or shaft 33, raising the ring, and inserting its pin in the registering opening 26 in the manner hereinbefore described the motor is thrown out or disconnected, since the clutch projection on said ring is no longer in engaging relation with the projection on the gear below, and the spindle can be operated by the hand-wheel, which may now be turned freely until the lost motion at the gate end of the spindle is taken up, when it is rotated in the usual manner and with the usual result.

Figure 7:
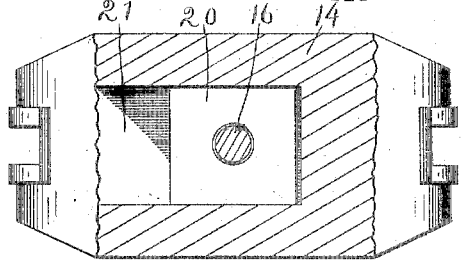

It will be clearly seen by referring to the drawings, particularly to Fig. 7, that the nut 20, although free to reciprocate in the recess provided for its reception in the gate 14, is not permitted to rotate therein. Any suitable means may be employed to prevent the nut 20 from rotating with the spindle 16; but that shown whereby said nut is contiguous with opposite sides of the gate-recess has been found to be simple and effective.

Although other than electric motors may be employed with my invention, the electric motor is preferred and when used must be insulated from the valve. Such insulation is effected by surrounding portions of the bolts 42, which secure the motor to the cap, with insulating material and by making the pinion 37 of rawhide or other suitable insulating material.

The intermediate shaft 33 may be extended above the pinion 35 and the hand-wheel fixed thereon instead of on the valve-spindle, if desired.

As before intimated, the slip-ring on the intermediate shaft or a lost-motion device which does not include means for adjusting the clutch-projection member longitudinally on said shaft can be used in connection with a reciprocating valve-spindle of the outside-screw construction. It has not been deemed necessary to illustrate the reciprocating spindle and nut for actuating the same in this application, as these members are well-known in the art; but it will be readily understood that a lost-motion device on the intermediate shaft will enable the motor to gather momentum before rotating the spindle-nut through the medium of connecting gears to elevate or depress the spindle and valve attached to its lower end, and a slip-ring used in this connection enables the operator to disconnect the motor and manipulate the spindle and valve with a hand-wheel, as in the other instance.

Changes in kind and arrangement of the gears may be made, as well as various alterations other than those hereinbefore pointed out, without departing from the nature of my invention.

In other applications filed in my name—to wit, application Serial No. 100,699, filed March 31, 1902, and application Serial No. 107,457, filed May 15, 1902—I have set forth and claimed in its broader aspects the general system herein embodied, the present application being confined to specific features recited in the claims, and notably the rotary non-reciprocating valve-stem.

What I claim as my invention, and desire to secure by Letters Patent, is—

1. A valve mechanism adapted to be opened and closed independently either by hand or by power, comprising the combination of a valve, a motor, a gate mounted in the valve-body, a rotating non-reciprocating spindle arranged in the valve-body to open or close the gate when the spindle is rotated, a train of gears arranged between the motor and the spindle whereby the spindle may be rotated when the motor is operated, a lost-motion device arranged in said train and normally in position to cause the spindle to rotate when the motor is put in motion, a hand-wheel and locking devices whereby the hand-wheel and the spindle may be readily put into and thrown out of operative connection with the motor.

2. In a valve mechanism adapted to be operated both by hand and by power, the combination of a valve-casing, a gate arranged therein, a non-reciprocating rotating spindle adapted to operate said gate, a hand-wheel or other equivalent means arranged to turn said spindle, a motor, a train of gearing between the motor and spindle whereby motion may be communicated from the motor to the spindle and a lost-motion device in said train comprising a rotating driving part in operative connection with the motor, the driving member having an abutment to engage the driven member after the driving member has made a part of a revolution, the whole being so arranged that when the motor is at rest the engaging abutments on the lost-motion members are separated from each other.

3. The combination with a valve-gate and a motor, of a spindle adapted to actuate said gate, driving mechanism between said spindle and motor, a lost-motion device in said mechanism, a hand-wheel capable of serving as a balance-wheel or as a medium for operating the spindle, and means to so adjust said lost-motion device as to disconnect the motor and leave the spindle to the control of said hand-wheel.

4. The combination with a valve-gate and a motor, of a non-reciprocating rotary spindle adapted to actuate said gate, a hand-wheel on said spindle, a gear loose on the spindle and having a clutch projection, a slip-ring revolubly connected with the spindle and provided with a clutch projection extending into the path of the first-mentioned projection when the ring is in normal position, driving mechanism between said gear and motor, and means to maintain said slip-ring with its projection out of the path of the gear projection to enable the spindle to be operated by said hand-wheel without affecting the other mechanism.

5. The combination with a valve-gate and a motor, of a spindle adapted to operate said gate, an intermediate shaft, a gear loose on said shaft and having a clutch projection, a slip-ring revolubly connected with said shaft, means to maintain said ring with its clutch projection out of the path of the gear projection, driving mechanism between said shaft and said motor and spindle, and a hand-wheel connected with said spindle for operating the same when the ring projection is out of the path of the gear projection.

6. The combination with a recessed valve-gate and a motor, of a non-reciprocating spindle, a train of gears between said spindle and motor adapted to rotate the former, one of the gears in said train being loose and having a clutch projection, a revoluble member provided with a clutch projection extending into the path of the first-mentioned projection, and a non-rotary nut in the gate-recess, threaded to the spindle and of less height than said recess.

7. The combination with a recessed valve-gate and a motor, of a non-reciprocating spindle, a train of gears between said spindle and motor adapted to rotate the former, one of the gears in said train being loose and having a clutch projection, a revoluble member provided with a clutch projection extending into the path of the first-mentioned projection, means to retain said member with its projection out of the path of the gear projection, and a non-rotary nut in the gate-recess, threaded to the spindle and of less height than said recess.

8. The combination with a recessed valve-gate and a motor, of a non-reciprocating spindle, a train of gears between said spindle and motor adapted to rotate the former, one of the gears in said train being loose and having a clutch projection, a revoluble member provided with a clutch projection extending into the path of the first-mentioned projection, means to retain said member with its projection out of the path of the gear projection, a non-rotary nut in the gate-recess, threaded to the spindle and of less height than said recess, and a hand-wheel capable of serving as a balance-wheel or as a medium for operating the spindle.

In testimony whereof I have signed my name to this specification in the presence of two subscribing witnesses.

ERNEST G. HOWARD.

Witnesses:
 ALLEN WEBSTER,
 F. A. CUTTER.